(12) United States Patent
Yasaki et al.

(10) Patent No.: US 8,245,006 B2
(45) Date of Patent: Aug. 14, 2012

(54) DATA STORAGE DEVICE AND DATA MANAGEMENT METHOD

(75) Inventors: Kouichi Yasaki, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/641,317

(22) Filed: Dec. 17, 2009

(65) Prior Publication Data

US 2011/0004738 A1  Jan. 6, 2011

(30) Foreign Application Priority Data

Dec. 26, 2008 (JP) ................................. 2008-332401

(51) Int. Cl.
*G06F 12/14* (2006.01)
(52) U.S. Cl. .......................................... 711/166; 726/30
(58) Field of Classification Search .......................... None
See application file for complete search history.

(56) References Cited

U.S. PATENT DOCUMENTS

| 7,448,083 B2 * | 11/2008 | Kashiwada | 726/23 |
| 7,509,441 B1 * | 3/2009 | Merry et al. | 710/8 |
| 7,996,911 B2 * | 8/2011 | Yoshida et al. | 726/26 |

FOREIGN PATENT DOCUMENTS

| JP | 4-217044 A | 8/1992 |
| JP | 2006-172351 A | 6/2006 |
| JP | 2006-211003 A | 8/2006 |
| JP | 2007-286679 A | 11/2007 |

* cited by examiner

*Primary Examiner* — Gary Portka
(74) *Attorney, Agent, or Firm* — Fujitsu Patent Center (57) ABSTRACT

A data storage device for storing and managing data includes a data memory, an input unit, a data writer, and a data deleter. The data memory stores data. The data memory includes a preferential deletion area for storing data which needs to be preferentially deleted. The input unit accepts input data. The data writer stores the input data in the data memory. The data deleter deletes data stored in the data memory. The data deleter starts to delete data stored in the preferential deletion area before starting to delete data stored in the data memory other than the preferential deletion area when a predefined condition is satisfied.

9 Claims, 10 Drawing Sheets

| CLUSTER NUMBER IN CONVERTED DATA AREA ~140 | CLUSTER NUMBER IN SECOND MEMORY AREA ~150 |
|---|---|
| CLUSTER_X | CLUSTER_a |
| CLUSTER_Y | CLUSTER_a |
| CLUSTER_Z | CLUSTER_b |

FIG. 10

| DESIGNATED CLUSTER NUMBER ~160 | REPLACED CLUSTER NUMBER ~170 |
|---|---|
| CLUSTER_b | CLUSTER_Y |
| CLUSTER_c | CLUSTER_X |
| CLUSTER_e | CLUSTER_T |

DATA STORAGE DEVICE AND DATA MANAGEMENT METHOD

FIELD

The embodiments discussed herein are related to a data storage device, and particularly related to a method for managing data stored in a data storage device.

BACKGROUND

Technologies for deleting data stored in a data storage device have been developed in order to prevent data stored in the data storage device from leaking to a third parry due to the loss or the theft of the data storage device or an apparatus including the data storage device. When it takes time to delete all the data stored in the data storage device, the third party may abort the deletion process in the middle of processing. When half of the data of the storage capacity may be deleted, for example, the remaining half of the data will be in danger of leaking. Therefore, the user may not be reassured. To reassure a user even when a large amount of data stored in a data storage device may not be deleted, a technology has been developed, in which encrypted data is stored in the data storage device, and the decryption key is deleted in response to an instruction for deletion. Japanese Laid-open Patent Publication No. 2006-211003 discloses a related technique. With the technology, only deleting the decryption key prevents the encrypted data from easy decryption. The user, however, may still be anxious about the decryption of the encrypted data by some method.

SUMMARY

According to an aspect of the present invention, provided is a data storage device for storing and managing data. The data storage device includes a data memory, an input unit, a data writer, and a data deleter.

The data memory stores data. The data memory includes a preferential deletion area for storing data which needs to be preferentially deleted.

The input unit accepts input data.

The data writer stores the input data in the data memory.

The data deleter deletes data stored in the data memory. The data deleter starts to delete data stored in the preferential deletion area before starting to delete data stored in the data memory other than the preferential deletion area when a predefined condition is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the embodiments, a specific storage area of a data storage device is handled as a preferential deletion area, that is, data stored in which area is more preferentially deleted than data stored in another storage area of the data storage device. Important data requiring preferential deletion is stored in the preferential deletion area. In emergency deletion, the data storage device starts to delete important data requiring preferential deletion before starts to other data. Thus, the anxiety of the user may be alleviated more than alleviated by conventional technologies.

With reference to drawings, embodiments of the present invention will be discussed below.

First Embodiment

Figure 1:
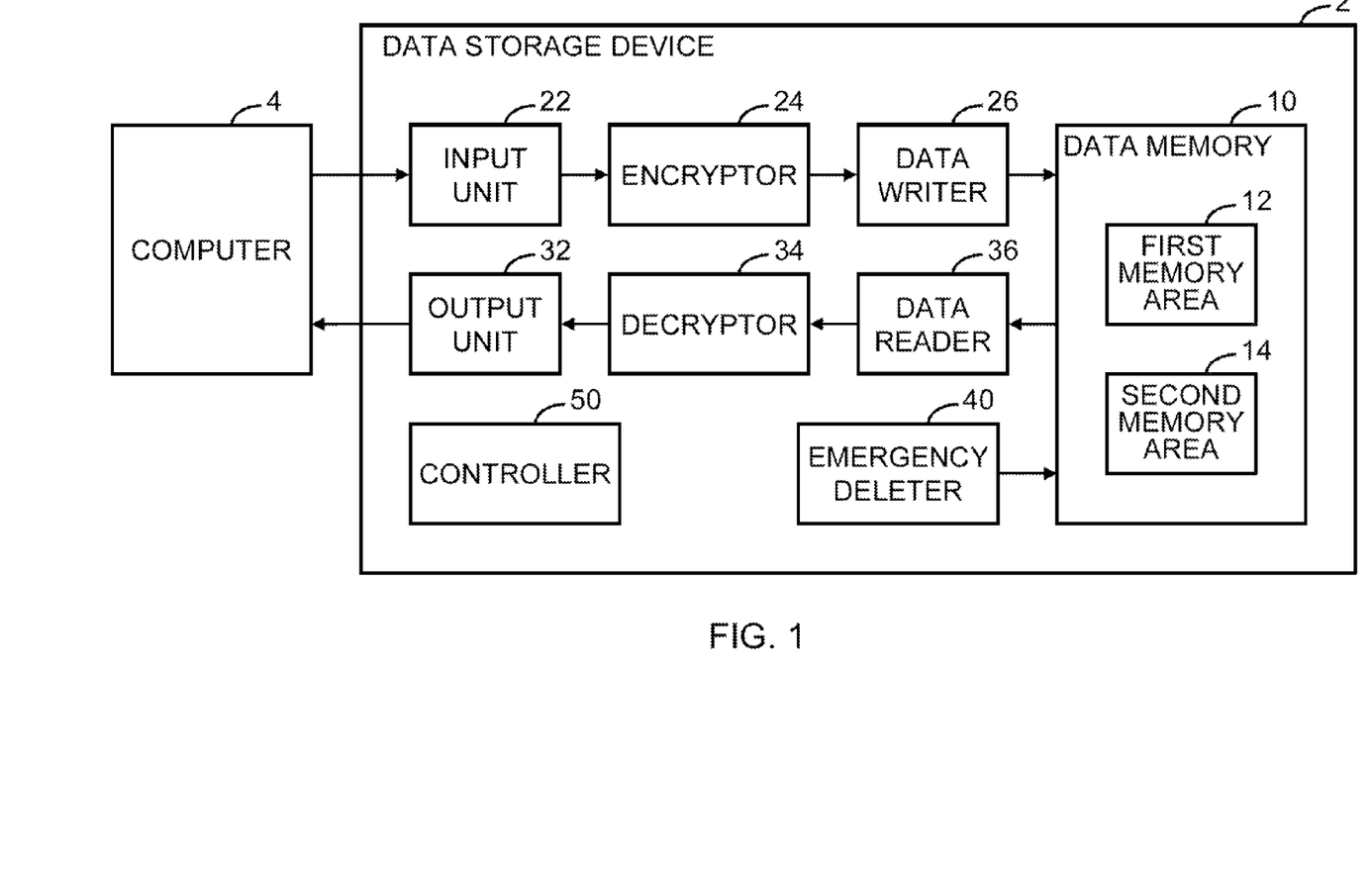
FIG. 1 is a diagram illustrating an example of a system configuration of a data storage device according to an embodiment of the present invention.

FIG. 1 is a diagram illustrating an example of a system configuration of a data storage device according to an embodiment of the present invention. As illustrated in FIG. 1, a data storage device 2 is capable of communicating with a computer 4 and includes a data memory 10, an input unit 22, an encryptor 24, a data writer 26, an output unit 32, a decryptor 34, a data reader 36, an emergency deleter 40, and a controller 50. The data storage device 2 may be built into the computer 4.

The data memory 10 includes a first memory area 12 and a second memory area (also referred to as a preferential deletion area) 14. In emergency deletion, the data stored in the second memory area 14 is deleted before the data stored in the first memory area 12 is deleted.

The input unit 22 sends data received from the computer 4 to the encryptor 24.

The encryptor 24 encrypts the data received from the input unit 22 with an encryption key and sends the encrypted data to the data writer 26.

The data writer 26 stores the encrypted data received from the encryptor 24 in the data memory 10.

The data reader 36 sends data read from the data memory 10 to the decryptor 34.

The decryptor 34 decrypts the data received from the data reader 36 with a decryption key and sends the decrypted data to the output unit 32. The encryption key and the decryption key may be an identical key or different keys.

The output unit 32 sends the decrypted data received from the decryptor 34 to the computer 4.

The emergency deleter 40 deletes the data stored in the data memory 10.

The controller 50 controls the entire data storage device 2. Among the functions to be processed by the data storage device 2, all functions which are not discussed explicitly herein are implemented by the controller 50.

Figure 2:
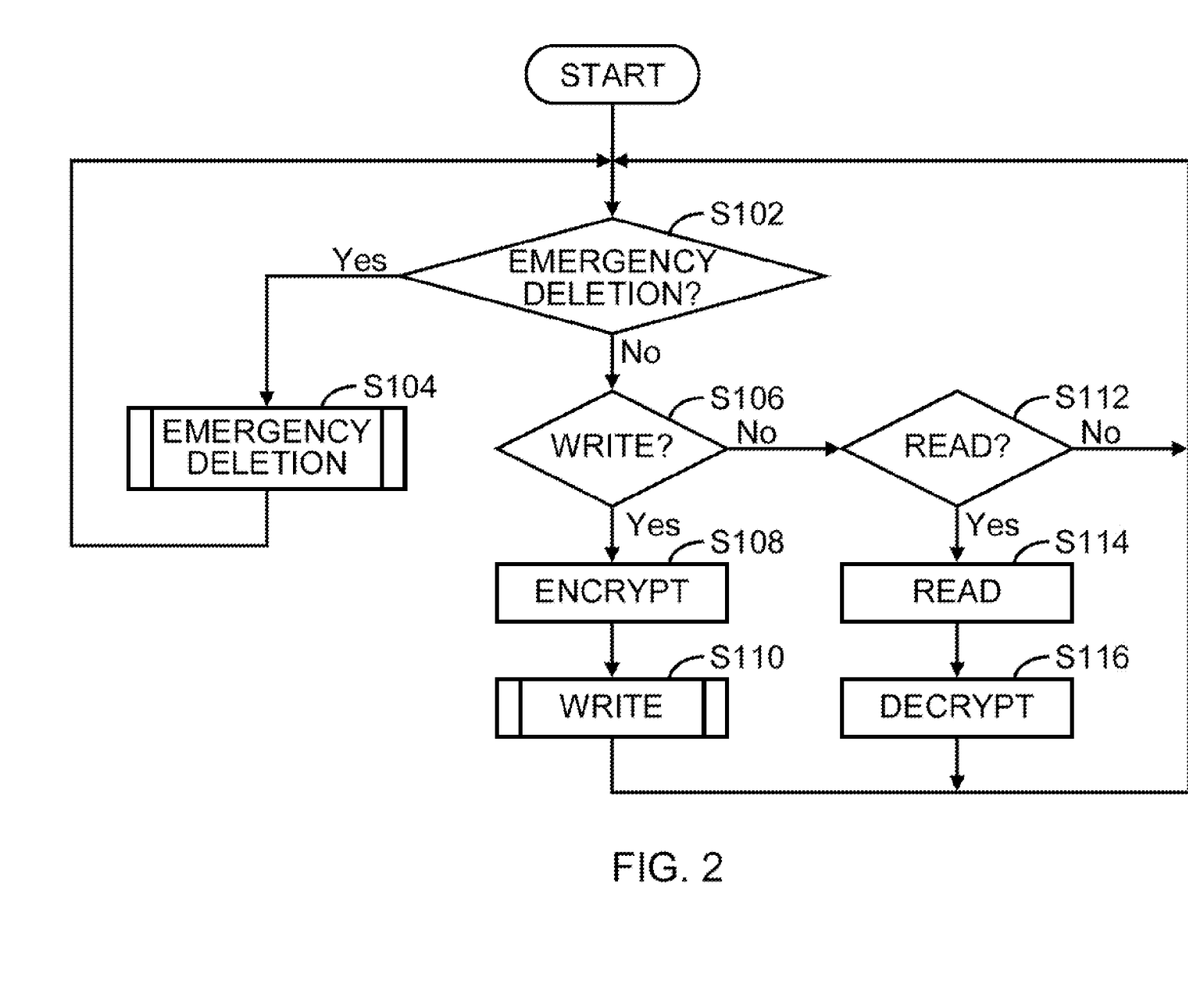
FIG. 2 is a diagram illustrating an example of an operation flow of a data storage device according to an embodiment of the present invention.

FIG. 2 is a diagram illustrating an example of an operation flow of a data storage device according to an embodiment of the present invention. With reference to FIG. 2, an example of an operation flow of the data storage device 2 according to the first embodiment of the present invention will be discussed.

In operation S102, the controller 50 determines whether the emergency deletion of data is required. The controller 50 determines that the emergency deletion of data is required when a predefined condition is satisfied. An arbitrary basis may be used for determining that the emergency deletion of data is required. For example, the controller 50 may determine that the emergency deletion of data is required when it has received an instruction for emergency deletion from the computer 4 or when the controller 50 has detected some abnormal access.

In operation S104, when the emergency deletion of data is required ("Yes" in operation S102), the emergency deleter 40 perform the emergency deletion. Then, the data storage device 2 returns the process to the operation S102.

In operation S106, when the emergency deletion of data is not required ("No" in operation S102), the controller 50 determines whether the input unit 22 has received from the computer 4 an instruction for writing data.

In operation S108, when the input unit 22 has received from the computer 4 an instruction for writing data ("Yes" in operation S106), the encryptor 24 encrypts data received from the input unit 22 with an encryption key and sends the encrypted data to the data writer 26.

In operation S110, the data writer 26 stores the encrypted data received from the encryptor 24 in the data memory 10. Then, the data storage device 2 returns the process to the operation S102.

In operation S112, when the input unit 22 has not received from the computer 4 an instruction for writing data ("No" in operation S106), the controller 50 determines whether the input unit 22 has received from the computer 4 an instruction for reading data. When the input unit 22 has not received from the computer 4 an instruction for reading data ("No" in operation S112), the data storage device 2 returns the process to the operation S102.

In operation S114, when the input unit 22 has received from the computer 4 an instruction for reading data ("Yes" in operation S112), the data reader 36 reads data from the data memory 10 and sends the data to the decryptor 34.

In operation S116, the decryptor 34 decrypts the data received from the data reader 36 with a decryption key and sends the decrypted data to the output unit 32. The output unit 32 sends the decrypted data received from the decryptor 34 to the computer 4. Then, the data storage device 2 returns the process to the operation S102.

When the data (referred to as write data) to be stored is important data, the data writer 26 stores the write data in the second memory area 14 which is the preferential deletion area. When the write data is unimportant data, the data writer 26 stores the write data in the first memory area 12. The data writer 26 determines whether the write data is important in accordance with a value of an importance flag. The value of the importance flag is set by the input unit 22 in response to an instruction by the computer 4. For example, when data to be saved in a specific folder (referred to as an important folder) is defined as important data, the computer 4 informs importance information determined in accordance with the folder to which the data is to be saved, to the data storage device 2 along with the instruction for writing data. The importance information may be informed in an arbitrary way. One method may use different instructions for writing data between the instruction for writing important data and the instruction for writing unimportant data. For example, the computer 4 may instruct to write important data with the "Trusted Send" command in Advanced Technology Attachment (ATA) commands and instruct to write unimportant data with the "write" command in the ATA commands. Alternatively, the computer 4 may send the importance information to the data storage device 2 separately from the instruction for writing data. For example, the computer 4 may instruct to write data with the "write" command and therewith inform the importance information with the "Trusted Send" command. More specifically, the computer 4 may transmit "1" with the "Trusted Send" command for writing important data and transmit "0" with the "Trusted Send" command for writing unimportant data, for example. Alternatively, the value of the importance flag may be designated by the computer 4. For example, the computer 4 may instruct to write data with the "write" command and transmit "1" or "0" as the value of the importance flag with the "Trusted Send" command. The computer 4 may transmit, before transmitting a first instruction for writing data, a value of the importance flag in accordance with the importance of the write data. In subsequent transmission of instructions for writing data, every time the importance of write data changes, the computer 4 may switch and transmit the value of the importance flag.

Figure 3:
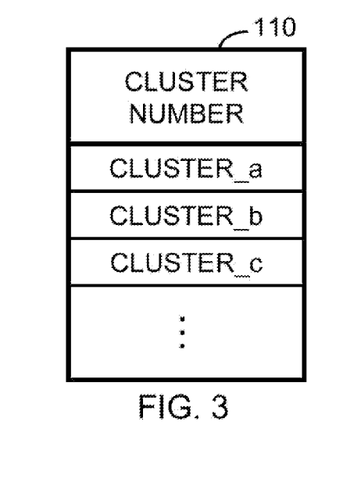
FIG. 3 is a diagram illustrating an example of a data configuration of a cluster list for a second memory area in a data storage device according to an embodiment of the present invention.

FIG. 3 is a diagram illustrating an example of a data configuration of a cluster list for a second memory area in a data storage device according to an embodiment of the present invention. In the example illustrated in FIG. 3, cluster numbers 110 each of which is capable of identifying a cluster within the second memory area are stored in a cluster list for the second memory area.

Figure 4:
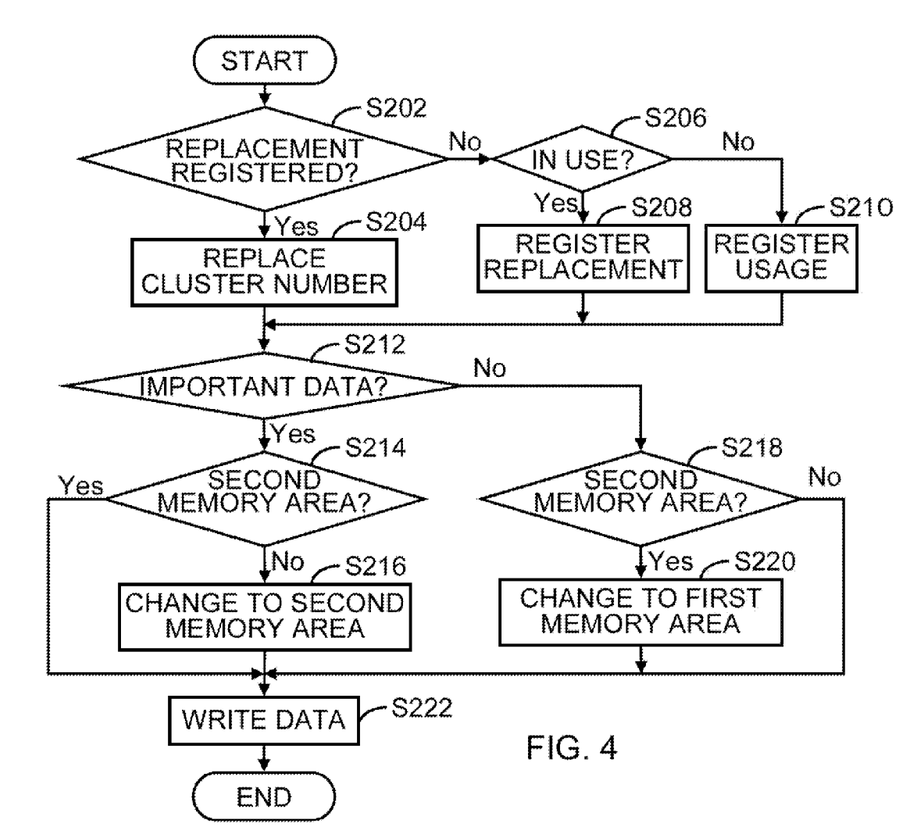
FIG. 4 is a diagram illustrating an example of an operation flow of a data writer of a data storage device according to an embodiment of the present invention.

FIG. 4 is a diagram illustrating an example of an operation flow of a data writer of a data storage device according to an embodiment of the present invention. With reference to FIG. 4, an example of an operation flow of the data writer 26 of the data storage device 2 according to the first embodiment of the present invention will be discussed.

Figure 5:
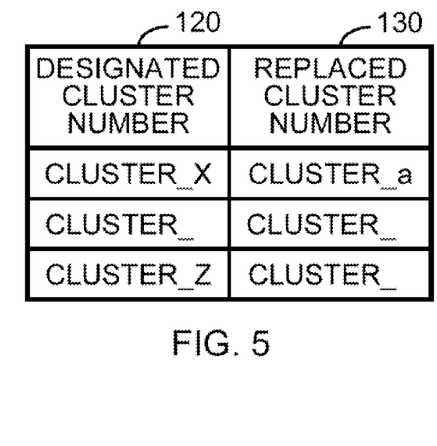
FIG. 5 is a diagram illustrating an example of a data configuration of a replacement table in a data storage device according to an embodiment of the present invention.

The data writer 26 replaces, when needed, a cluster number (referred to as a designated cluster number) designated by the controller 50 as a cluster number of a cluster (referred to as a write destination) in which the data is to be stored, with another cluster number. FIG. 5 is a diagram illustrating an example of a data configuration of a replacement table in a data storage device according to an embodiment of the present invention. Each record of the replacement table contains a "designated cluster number" field 120 and a "replaced cluster number" field 130.

In operation S202, The data writer 26 determines whether the cluster number designated as the cluster number of the write destination by the controller 50 has been registered in the replacement table.

In operation S204, when the designated cluster number has been registered in the replacement table ("Yes" in operation S202), the data writer 26 performs replacement of the cluster number in accordance with the replacement table.

In operation S206, when the designated cluster number has not been registered in the replacement table ("No" in operation S202), the data writer 26 determines whether the designated cluster number is in use, that is, whether the designated cluster number is stored in "replaced cluster number" field 130 of some record of the replacement table.

In operation S208, when the designated cluster number is in use ("Yes" in operation S206), the data writer 26 replaces the designated cluster number with another cluster number and updates the replacement table.

In operation S210, when the designated cluster number is not in use ("No" in operation S206), the data writer 26 updates the replacement table so as to use the designated cluster number as it is.

In operation S212, the data writer 26 determines the importance of write data in accordance with the value of the importance flag.

In operation S214, when the write data is important data ("Yes" in operation S212), the data writer 26 determines whether the write destination is within the second memory area 14 in accordance with the cluster list for the second memory area. When the write destination is within the second memory area 14 ("Yes" in operation S214), the data writer 26 advances the process to operation S222.

In operation S 216, when the write destination is outside the second memory area 14 ("No" in operation S214), the data writer 26 changes the write destination to a cluster within the second memory area 14 and updates the replacement table. When the cluster number of the write destination is in use, that is, when the cluster number of the write destination is stored in the "replaced cluster number" field 130 of some record of the replacement table, the cluster number of the write destination is changed to a new cluster number. When the cluster number of the write destination is not in use, the data writer 26 generates a new record of the replacement table.

In operation S218, when the write data is not important data ("No" in operation S212), the data writer 26 determines whether the write destination is within the second memory area 14 in accordance with the cluster list for the second memory area. When the write destination is outside the second memory area 14 ("No" in operation S218), the data writer 26 advances the process to operation S222.

In operation S220, when the write destination is within the second memory area 14 ("Yes" in operation S218), the data writer 26 changes the write destination to a cluster within the first memory area 12 and updates the replacement table. For this purpose, a cluster list for the first storage area in which cluster numbers capable of identifying clusters within the first memory area are registered may be provided. Instead of providing the cluster list for the first storage area, the write destination may be changed to a cluster outside the second memory area 14.

In operation S222, the data writer 26 stores the write data in the data memory 10.

Figure 6:
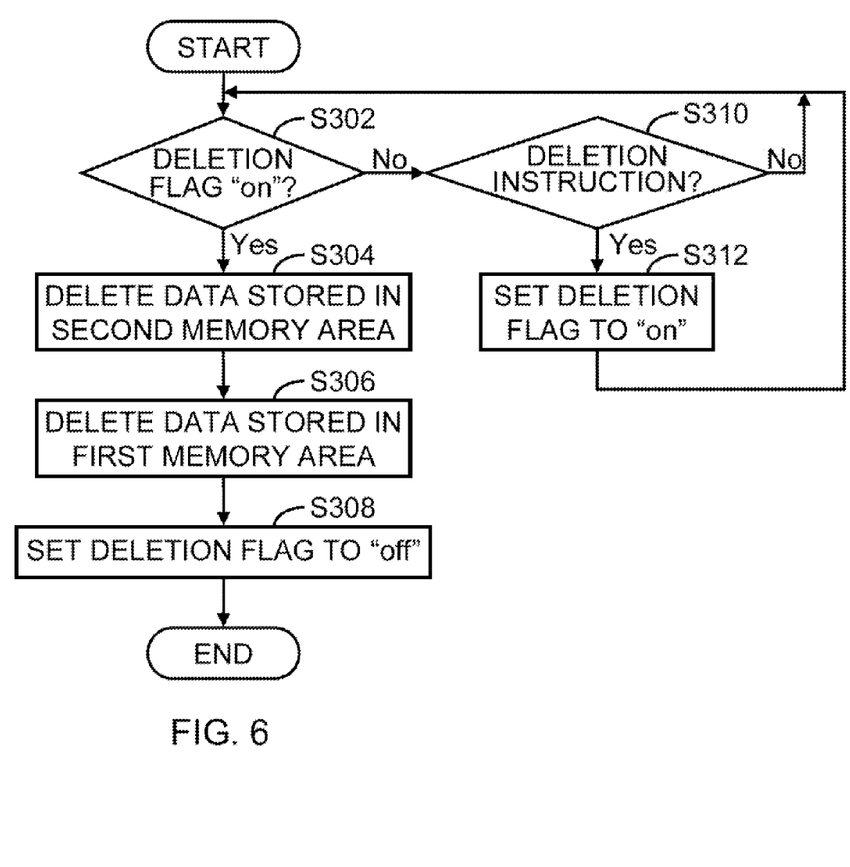
FIG. 6 is a diagram illustrating an example of an operation flow of an emergency deleter of a data storage device according to an embodiment of the present invention.

FIG. 6 is a diagram illustrating an example of an operation flow of an emergency deleter of a data storage device according to an embodiment of the present invention. With reference to FIG. 6, an example of an operation flow of an emergency deleter of a data storage device according to an embodiment of the present invention will be discussed.

In operation S302, the emergency deleter 40 determines whether an emergency deletion flag is "on".

In operation S304, when the emergency deletion flag is "on" ("Yes" in operation S302), the emergency deleter 40 deletes the data stored in the second memory area 14.

In operation S306, the emergency deleter 40 deletes the data stored in the first memory area 12.

In operation S308, the emergency deleter 40 sets the emergency deletion flag to "off".

In operation S310, when the emergency deletion flag is not "on" ("No" in operation S302), the emergency deleter 40 determines whether emergency deletion has been instructed by the controller 50. When the emergency deletion has not been instructed by the controller 50 ("No" in operation S310), the emergency deleter 40 returns the process to operation S302.

In operation S312, when the emergency deletion has been instructed by the controller 50 ("Yes" in operation S310), the emergency deleter 40 sets the emergency deletion flag to "on". Then, the emergency deleter 40 returns the process to operation S302.

As discussed above, according to the first embodiment of the present invention, important data requiring preferential deletion is stored in the second memory area 14, i.e., the preferential deletion area, and the other data is stored in the first memory area 12. In the emergency deletion, because data stored in the preferential deletion area is deleted first, important data requiring preferential deletion may have been deleted even when the emergency deletion is aborted in the middle of processing. Therefore, the anxiety of the user may be alleviated more than alleviated by conventional technologies.

In the discussion above, when the write destination of important data is outside the preferential deletion area, the write destination is changed to a cluster within the preferential deletion area. Instead, when the write destination of important data is outside the preferential deletion area, the write destination may be added to the preferential deletion area. Alternatively, when the write destination of data other than important data is within the preferential deletion area, the write destination may be excluded from the preferential deletion area.

The decryption key is preferably stored in the second memory area. The encryption process by the encryptor 24 and the decryption process by the decryptor 34 may be omitted.

The second memory area 14 may be configured by a storage medium having a different deletion characteristic from a storage medium configuring the first memory area 12. In this case, the storage medium configuring the second memory area 14 preferably allows faster data deletion than the storage medium configuring the first memory area 12.

Second Embodiment

Figure 7:
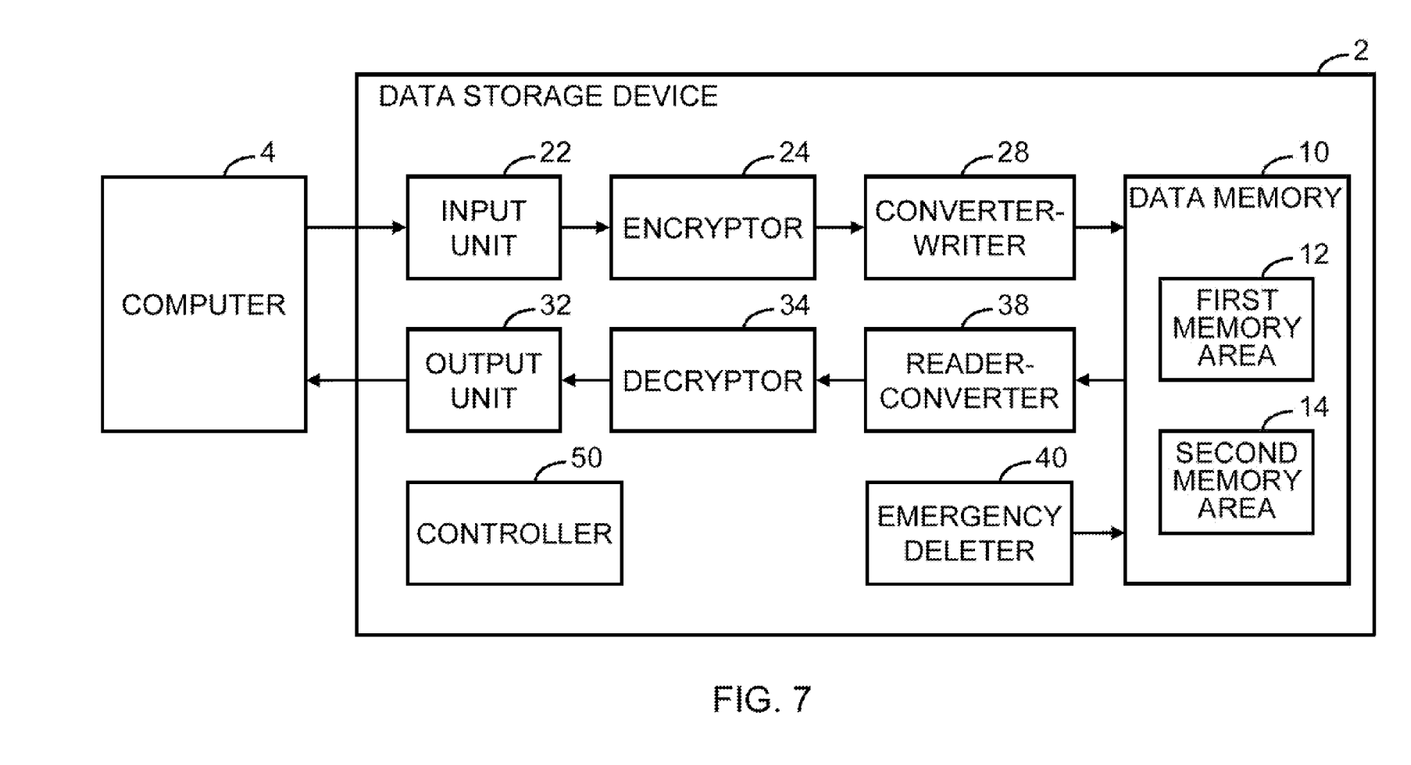
FIG. 7 is a diagram illustrating an example of a system configuration of a data storage device according to an embodiment of the present invention.

FIG. 7 is a diagram illustrating an example of a system configuration of a data storage device according to an embodiment of the present invention. As illustrated in FIG. 7, the system configuration of the data storage device 2 according to the second embodiment includes a converter-writer 28 and a reader-converter 38 instead of the data writer 26 and data reader 36, respectively, in comparison with the system configuration of the data storage device 2 according to the first embodiment illustrated in FIG. 1.

In the second embodiment, conversion data generated from random numbers is stored as preset data in the second memory area 14. The data input from the computer 4 is converted in accordance with the conversion data stored in the second memory area 14 and the converted data is stored in the first memory area 12.

The converter-writer 28 stores data received from the encryptor 24 in the data memory 10. When the write destination is a predetermined cluster, the converter-writer 28 converts the data received from the encryptor 24 in accordance with the conversion data stored in the second memory area 14 and stores the converted data in the first memory area 12.

The reader-converter 38 sends data read from the first memory area 12 to the decryptor 34. When the cluster (referred to as the read source) from which the data is to be read is a predetermined cluster, the reader-converter 38 inverses, i.e., inversely converts, the data read from the first memory area 12 in accordance with inversion data stored in the second memory area 14 and sends the inverted data to the decryptor 34.

The conversion data and the inversion data may be identical data or different data. In the discussion on the second embodiment, it is assumed that the conversion data and the inversion data are identical data, which is referred to as conversion data. The area to which the converted data is to be stored is referred to as a converted data area.

The converter-writer 28 generates a conversion table including a record containing a cluster number of a cluster within the converted data area of the first memory area 12 and a cluster within the second memory area 14. The conversion table is preferably stored in the second memory area 14.

Figure 8:
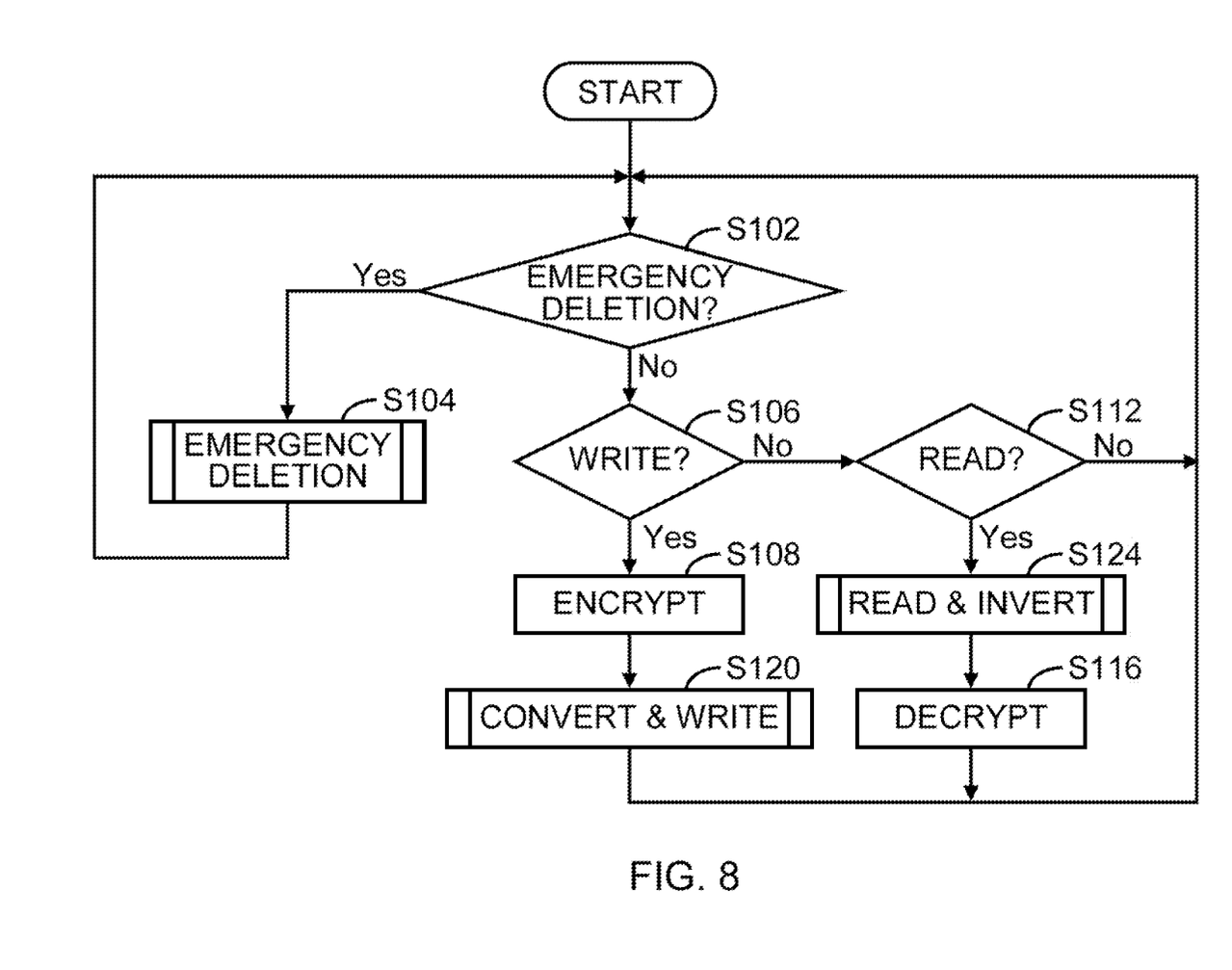
FIG. 8 is a diagram illustrating an example of an operation flow of a data storage device according to an embodiment of the present invention.

FIG. 8 is a diagram illustrating an example of an operation flow of a data storage device according to an embodiment of the present invention. As illustrated in FIG. 8, the operation flow of the data storage device 2 according to the second embodiment includes operation S120 and operation S124 instead of operation S110 and operation S114, respectively, in the operation flow of the data storage device 2 according to the first embodiment illustrated in FIG. 2. Among the operations in the operation flow of the data storage device 2 according to the second embodiment illustrated in FIG. 8, different operations from those in the operation flow of the data storage device 2 according to the first embodiment illustrated in FIG. 2 will be discussed.

In operation S108, when the input unit 22 has received from the computer 4 an instruction for writing data ("Yes" in operation S106), the encryptor 24 encrypts the data received from the input unit 22 with an encryption key and sends the encrypted data to the converter-writer 28.

In operation S120, the converter-writer 28 performs a "convert & write" process on the encrypted data received from the encryptor 24. Then, the data storage device 2 returns the process to the operation S102.

In operation S124, when the input unit 22 has received from the computer 4 an instruction for reading data ("Yes" in operation S112), the reader-converter 38 performs a "read & invert" process and sends the inverted data to the decryptor 34.

In operation S116, the decryptor 34 decrypts the inverted data received from the reader-converter 38 with a decryption key and sends the decrypted data to the output unit 32. The output unit 32 sends the decrypted data received from the decryptor 34 to the computer 4. Then, the data storage device 2 returns the process to the operation S102.

Figure 9:
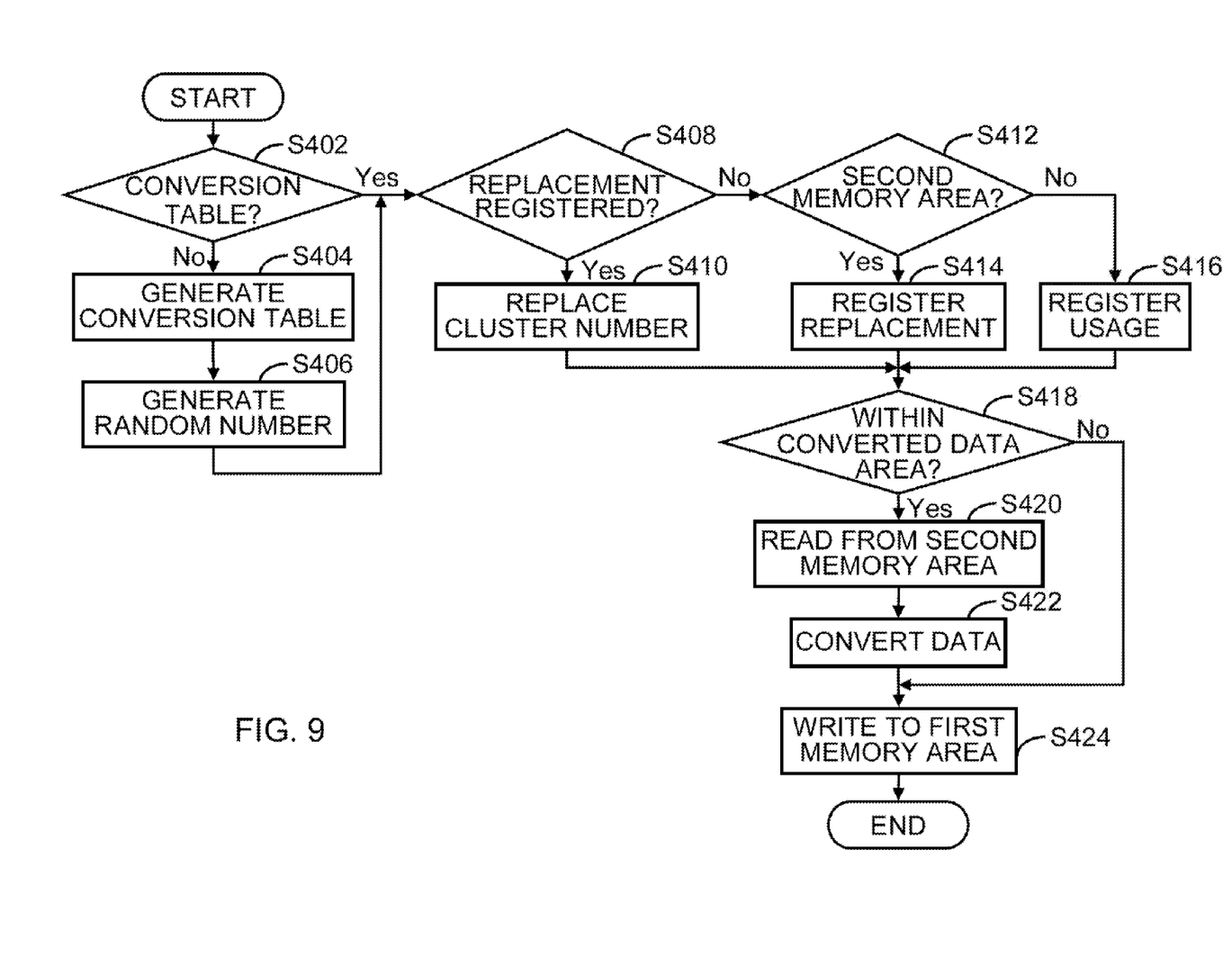
FIG. 9 is a diagram illustrating an example of an operation flow of a converter-writer of a data storage device according to an embodiment of the present invention.

FIG. 9 is a diagram illustrating an example of an operation flow of a converter-writer of a data storage device according to an embodiment of the present invention. With reference to FIG. 9, an example of an operation flow of the converter-writer 28 of the data storage device 2 according to the second embodiment of the present invention will be discussed.

In operation S402, the converter-writer 28 determines whether the conversion table exists. When the conversion table exists ("Yes" in operation S402), the converter-writer 28 advances the process to operation S408.

In operation S404, when the conversion table dose not exist ("No" in operation S402), the converter-writer 28 generates the conversion table.

Figure 10:
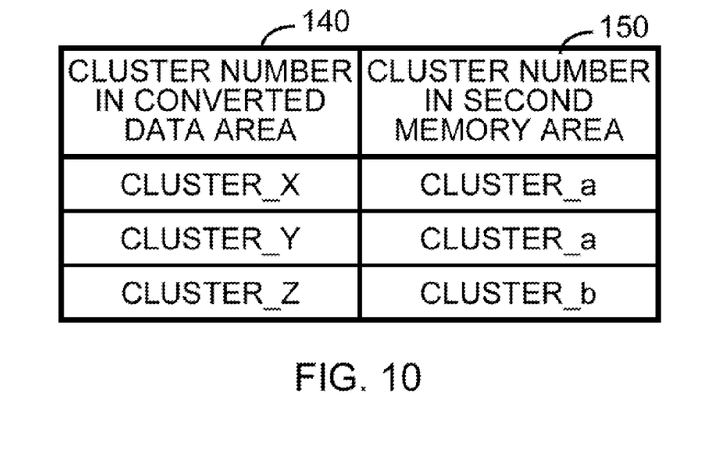
FIG. 10 is a diagram illustrating an example of a data configuration of a conversion table in a data storage device according to an embodiment of the present invention.

FIG. 10 is a diagram illustrating an example of a data configuration of a conversion table in a data storage device according to an embodiment of the present invention. As illustrated in FIG. 10, each record of the conversion table includes a "cluster number in converted data area" field 140 containing a cluster number ("cluster_X", "cluster_Y", and "cluster_Z" in FIG. 10, for example) of a cluster within the converted data area of the first memory area 12 and a "cluster number in second memory area" field 150 containing a cluster number ("cluster_a", "cluster_a", and "cluster_b" in FIG. 10, for example) of a cluster within the second memory area 14. For example, among the clusters of the first memory area 12, the clusters corresponding to the D-drive may be associated with a cluster in the second memory area 14. In the example illustrated in FIG. 10, it is assumed that the cluster number (such as "cluster_X") contained in the "cluster number in converted data area" field 140 is one cluster number. However, plural cluster numbers may be contained. For example, because "cluster_X" and "cluster_Y" in FIG. 10 are both associated with "cluster_a", they may be merged to one. Then, "cluster_X, cluster_Y" may be contained in the "cluster number in converted data area" field 140 while "cluster_a" may be contained in the corresponding "cluster number in second memory area" field 150. Alternatively, like "from cluster_X to cluster_Y" or "cluster_X-cluster_Y", a series of subsequent cluster numbers may be contained.

In operation S406, the converter-writer 28 generates conversion data from random numbers and stores the generated conversion data in a cluster in the second memory area 14.

In operation S408, the converter-writer 28 determines whether the cluster number designated as a write destination by the controller 50 has been registered in the replacement table.

Figure 11:
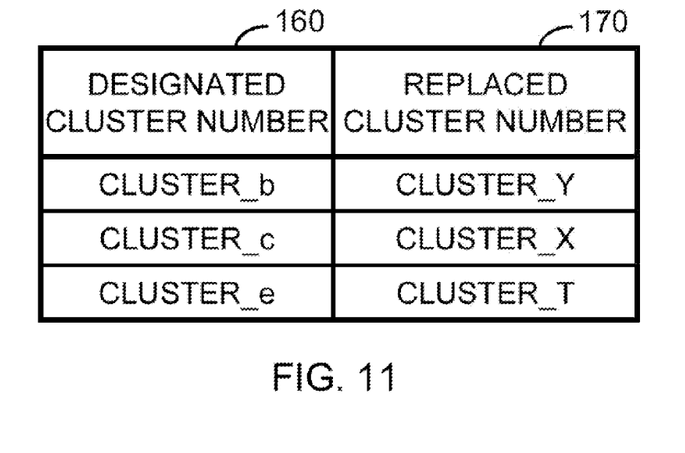
FIG. 11 is a diagram illustrating an example of a data configuration of a replacement table in a data storage device according to an embodiment of the present invention.

When the designated cluster number is a cluster number of a cluster in the second memory area 14, the converter-writer 28 replaces the designated cluster number with a cluster number of a cluster in the first memory area 12. FIG. 11 is a diagram illustrating an example of a data configuration of a replacement table in a data storage device according to an embodiment of the present invention. Each record of the replacement table contains a "designated cluster number" field 160 and a "replaced cluster number" field 170.

In operation S410, when the designated cluster number has been registered in the replacement table ("Yes" in operation S408), the converter-writer 28 performs replacement of the cluster number in accordance with the replacement table. Then, the converter-writer 28 advances the process to operation S418.

In operation S412, when the designated cluster number has not been registered in the replacement table ("No" in operation S408), the converter-writer 28 determines whether the designated cluster number is included in the cluster list for the second memory area. The cluster list for the second memory area is the same as the cluster list for the second memory area according to the first embodiment illustrated in FIG. 3.

In operation S414, when the designated cluster number is included in the cluster list for the second memory area ("Yes" in operation S412), the converter-writer 28 replaces the designated cluster number with a cluster number of a cluster in the first memory area 12 and updates the replacement table.

In operation S416, when the designated cluster number is not included in the cluster list for the second memory area ("No" in operation S412), the converter-writer 28 updates the replacement table so as to use the designated cluster number as it is.

In operation S418, the converter-writer 28 determines whether the write destination is within the converted data area. For example, in the example illustrated in FIG. 10, when the write destination is one of "cluster_X", "cluster_Y", and "cluster_Z" in the first memory area 12, the write destination is within the converted data area. When the write destination is not any of "cluster_X", "cluster_Y", and "cluster_Z" in the first memory area 12, the write destination is outside the converted data area. When the write destination is outside the converted data area ("No" in operation S418), the converter-writer 28 advances the process to operation S424.

In operation S420, when the write destination is within the converted data area ("Yes" in operation S418), the converter-writer 28 reads, in accordance with the conversion table, the conversion data from the cluster in the second memory area 14, which corresponds to the write destination.

In operation S422, the converter-writer 28 converts the encrypted data received from the encryptor 24 in accordance with the conversion data read from the second memory area 14. The conversion may be performed in an arbitrary way. For example, "Exclusive OR (XOR)" operation on each bit or encryption may be performed. In the case of encryption, data of a predetermined bit count in the conversion data may be used as an encryption key. In the case of XOR, the conversion data may be repeatedly used as required. Because the conversion of data stored in the converted data area in accordance with information depending on the cluster in this way may increase the difficulty of the decryption, the anxiety of the user about the decryption may be alleviated.

In operation S424, the converter-writer 28 stores the converted data in the write destination within the first memory area 12.

Figure 12:
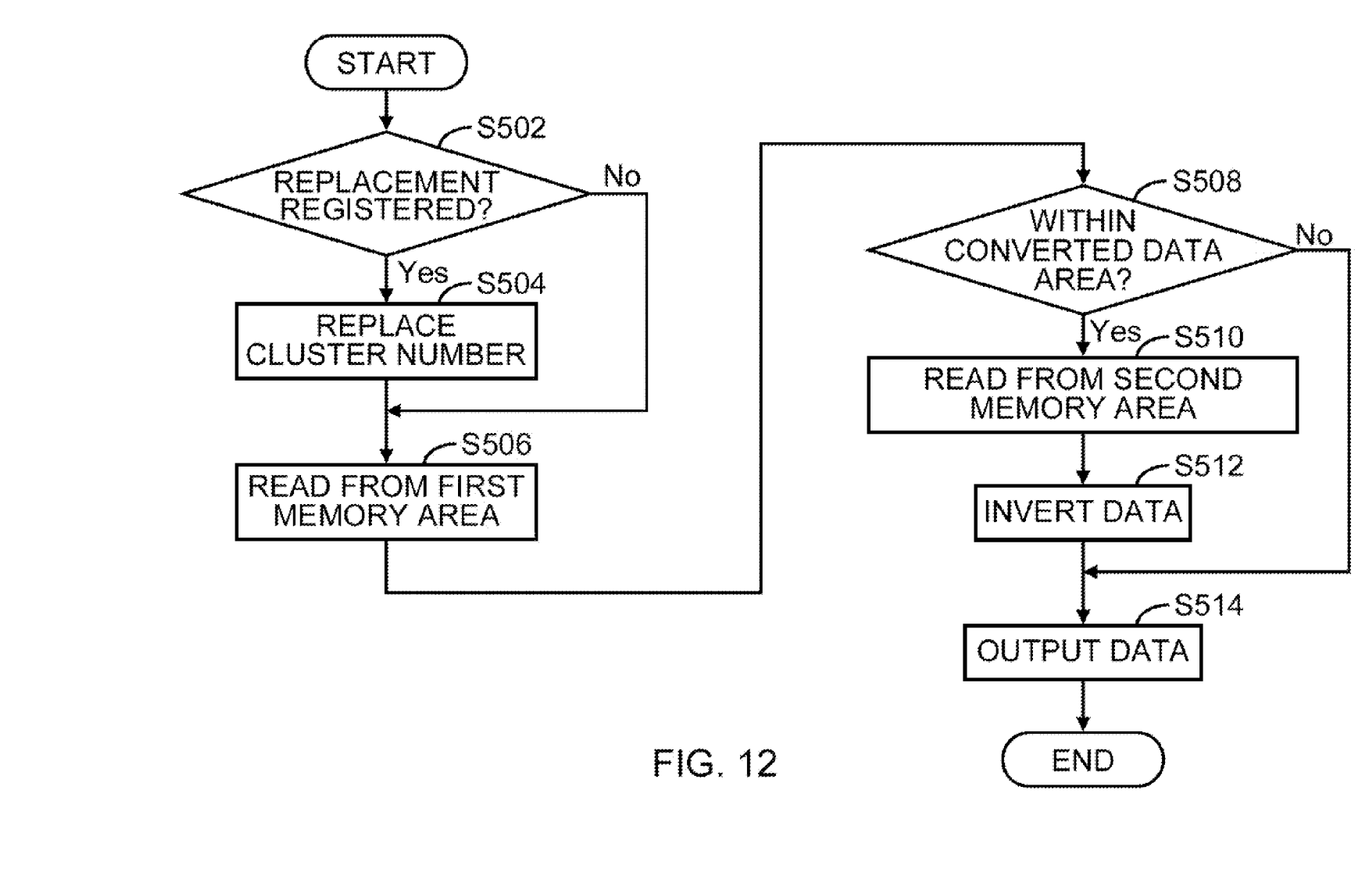
FIG. 12 is a diagram illustrating an example of an operation flow of a reader-converter of a data storage device according to an embodiment of the present invention.

FIG. 12 is a diagram illustrating an example of an operation flow of a reader-converter of a data storage device according to an embodiment of the present invention. With reference to FIG. 12, an example of an operation flow of the reader-converter 38 in the data storage device 2 according to the second embodiment of the present invention will be discussed.

In operation S502, the reader-converter 38 determines whether the cluster number designated by the controller 50 as a cluster (referred to as a read source) from which the data is to be read has been registered in the replacement table. When the designated cluster number has not been registered in the replacement table ("No" in operation S502), the reader-converter 38 advances the process to operation S506.

In operation S504, when the designated cluster number has been registered in the replacement table ("Yes" in operation S502), the reader-converter 38 converts the designated cluster number in accordance with the replacement table.

In operation S506, the reader-converter 38 reads data from the read source within the first memory area 12.

In operation S508, the reader-converter 38 determines whether the read source is within the converted data area. When the read source is outside the converted data area ("No" in operation S508), the reader-converter 38 advances the process to operation S514.

In operation S510, when the read source is within the converted data area ("Yes" in operation S508), the reader-converter 38 reads, in accordance with the conversion table, the conversion data from the cluster within the second memory area 14, corresponding to the read source.

In operation S512, the reader-converter 38 inverts the data read from the read source within the first memory area 12 in accordance with the conversion data read from the second memory area 14.

In operation S514, the reader-converter 38 sends the inverted data to the decryptor 34.

As discussed above, according to the second embodiment of the present invention, plural pieces of preset data, i.e., conversion data, required for reproducing the data stored in the first memory area 12 are stored in the second memory area 14, i.e., the preferential deletion area. In response to an emergency deletion instruction, the data stored in the preferential deletion area is deleted first. In other words, plural pieces of recovery data required for reproducing data stored in the data storage device are stored in a predetermined preferential deletion area, and data in the preferential deletion area is deleted first upon emergency deletion. Accordingly, the anxiety of the user may be more alleviated than alleviated by conventional technologies.

All the data stored in the first memory area 12 may be converted, but the amount of unnecessary processing may be reduced by converting only the cluster corresponding to the D-drive, for example, as discussed above in the second embodiment.

When it is ensured that the write destination designated by the computer 4 is a cluster within the first memory area 12, the replacement process may not be necessary.

Third Embodiment

In the second embodiment, the converted data area is fixedly preset, and the data stored in the converted data area is protected. According to a third embodiment of the present invention, the converted data area is dynamically set in order to address the case where the data to be protected is stored in an area other than the converted data area. An arbitrary method may be applied for designating the data to be protected. In an example of the third embodiment, it is assumed that important data is designated by the computer, like in the first embodiment.

The system configuration of the data storage device 2 according to an example of the third embodiment is similar to the system configuration of the data storage device 2 according to the example of the second embodiment illustrated in FIG. 7. However, in the third embodiment, the detail process of the converter-writer 28 is different from that in the second embodiment. The converter-writer 28 in the third embodiment updates, in addition to the process discussed in the second embodiment, the conversion table when storing important data in the write destination which is outside the converted data area, such that the write destination may become a cluster within the converted data area.

The conversion table may be the same as the example of the conversion table in the data storage device 2 according to the second embodiment of the present invention illustrated in FIG. 10.

Figure 13:
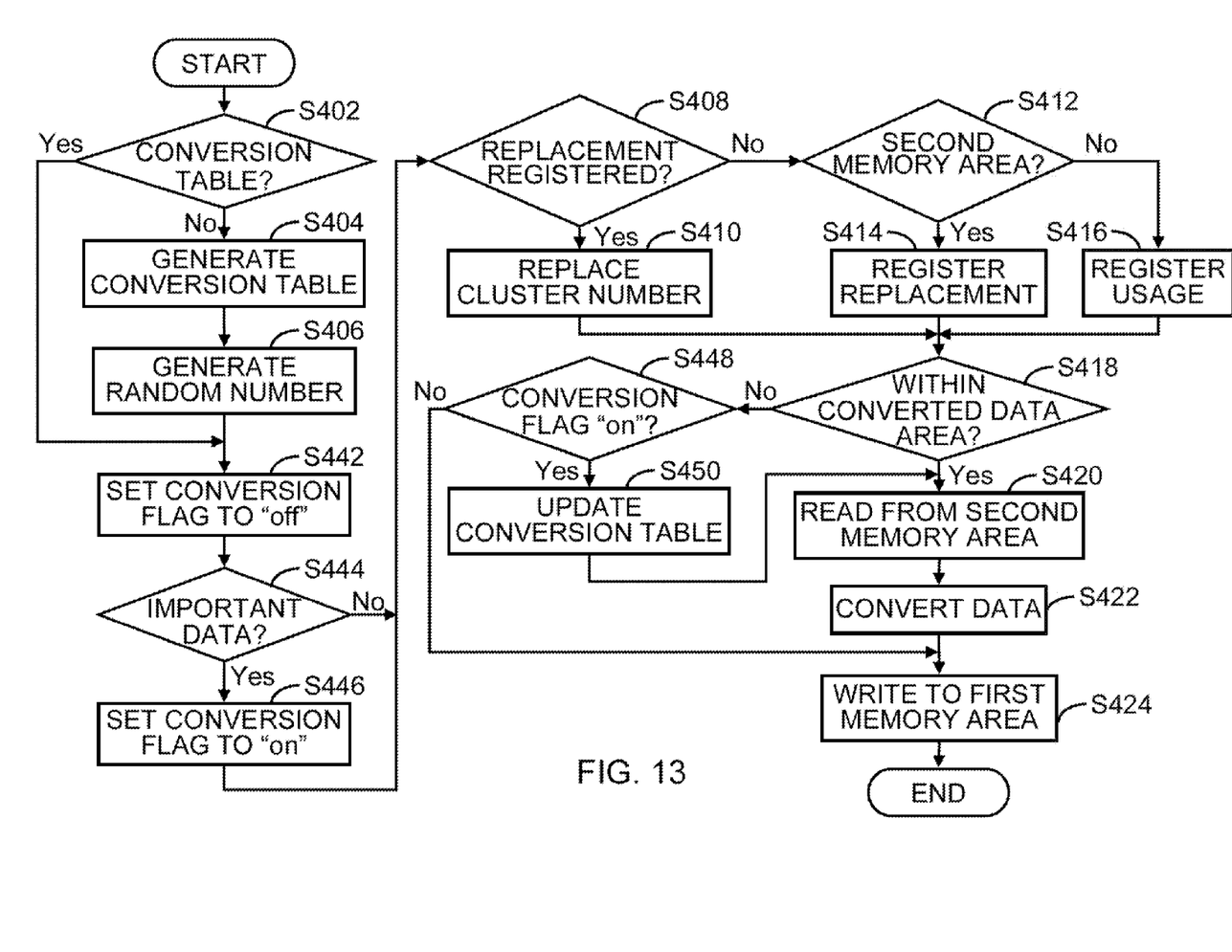
FIG. 13 is a diagram illustrating an example of an operation flow of a converter-writer of a data storage device according to an embodiment of the present invention.

FIG. 13 is a diagram illustrating an example of an operation flow of a converter-writer of a data storage device according to an embodiment of the present invention. The difference from the operation flow of the converter-writer 28 of the data storage device 2 according to the second embodiment illustrated in FIG. 9 is that it further includes operation S442 to operation S450. Among the operations of the operation flow of the converter-writer 28 according to the third embodiment illustrated in FIG. 13, operations different from those in the operation flow of the converter-writer 28 according to the second embodiment illustrated in FIG. 9 will be discussed.

In Operation S442, the converter-writer 28 sets a value of a conversion flag to "off".

in operation S444, the converter-writer 28 determines whether the write data is important data in accordance with the value of an importance flag. The method for setting the value of the importance flag is the same as that in the first embodiment of the present invention. When the write data is not important data ("No" in operation S444), the converter-writer 28 advances the process to operation S408.

In operation S446, when the write data is important data ("Yes" in operation S444), the converter-writer 28 changes the value of the conversion flag to "on".

In operation S448, when the write destination is outside the converted data area ("No" in operation S418), the converter-writer 28 determines whether the value of the conversion flag is "on". When the value of the conversion flag is not "on" ("No" in operation S448), the converter-writer 28 advances the process to operation S424.

In operation S450, when the value of the conversion flag is "on" ("Yes" in operation S448), the converter-writer 28 updates the conversion table so as to add the cluster number of the write destination as a cluster within the converted data area and sets corresponding conversion data.

As discussed above, according to the third embodiment, the area actually storing the data to be protected may only be handled as the converted data area. Thus, the amount of conversion processing may be less than that in the second embodiment.

The cluster storing the data to be protected may be not only handled as the converted data area, but also it may be added to the second memory area 14, i.e., the preferential deletion area.

The data storage device 2 according to the embodiments of the present invention may be implemented as hardware or software of a computer. For example, the data storage device 2 may be implemented by generating a program causing a computer to execute the functions of the input unit 22, encryptor 24, data writer 26, output unit 32, decryptor 34, data reader 36, emergency deleter 40, and controller 50 illustrated in FIG. 1, loading the program to the memory of the computer, and executing the computer.

The components of the data storage device according to the embodiments of the present invention may be combined in an arbitrary manner for implementation. Plural components may be implemented as one member, or one component may include plural members.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data storage device for storing and managing data, the data storage device comprising:
   a data memory for storing data, the data memory including
      a preferential deletion area for storing data which needs to be preferentially deleted;
   an input unit for accepting input data;
   a data writer for
      storing the input data in a part of the data memory,
      determining whether the input data needs to be preferentially deleted, determining whether the part is included in the preferential deletion area, and
      adding the part to the preferential deletion area when the input data needs to be preferentially deleted and when the part is not included in the preferential deletion area; and
   a data deleter for deleting data stored in the data memory, wherein the data deleter starts to delete data stored in the preferential deletion area before starting to delete data stored in the data memory other than the preferential deletion area when a predefined condition is satisfied.

2. The data storage device of claim 1, wherein
   the data writer
      converts the input data in accordance with preset data stored in the preferential deletion area, and
      stores the converted input data in the data memory.

3. The data storage device of claim 1, wherein
   the data writer excludes the part from the preferential deletion area when the input data does not need to be preferentially deleted and when the part is included in the preferential deletion area.

4. A data management method executed by a data storage device for storing and managing data, the data storage device including a data memory for storing data, the data memory including a preferential deletion area for storing data which needs to be preferentially deleted, the data management method comprising:
   accepting input data;
   storing the input data in a part of the data memory;
   determining whether the input data needs to be preferentially deleted;
   determining whether the part is included in the preferential deletion area;
   adding the part to the preferential deletion area when the input data needs to be preferentially deleted and when the part is not included in the preferential deletion area;
   determining, by the data storage device, whether a predefined condition is satisfied; and
   starting, by the data storage device, to delete data stored in the preferential deletion area before starting to delete data stored in the data memory other than the preferential deletion area when the predefined condition is satisfied.

5. The data management method of claim 4, wherein
   the storing the input data including:
      converting the input data in accordance with preset data stored in the preferential deletion area, and
      storing the converted input data in the data memory.

6. The data management method of claim 4, further comprising:
   excluding the part from the preferential deletion area when the input data does not need to be preferentially deleted and when the part is included in the preferential deletion area.

7. A non-transitory computer-readable medium storing a data management program that causes a computer to act as a data storage device for storing and managing data, the data storage device comprising:
   a data memory for storing data, the data memory including
      a preferential deletion area for storing data which needs to be preferentially deleted;
   an input unit for accepting input data;
   a data writer for storing the input data in a part of the data memory, determining whether the input data needs to be preferentially deleted, determining whether the part is included in the preferential deletion area, and adding the part to the preferential deletion area when the input data needs to be preferentially deleted and when the part is not included in the preferential deletion area; and a data deleter for deleting data stored in the data memory, wherein the data deleter starts to delete data stored in the preferential deletion area before starting to delete data stored in the data memory other than the preferential deletion area when a predefined condition is satisfied.

8. The non-transitory computer-readable medium of claim 7, wherein the data writer converts the input data in accordance with preset data stored in the preferential deletion area, and stores the converted input data in the data memory.

9. The non-transitory computer-readable medium of claim 7, wherein the data writer excludes the part from the preferential deletion area when the input data does not need to be preferentially deleted and when the part is included in the preferential deletion area.

* * * * *